United States Patent Office 3,150,690
Patented Sept. 29, 1964

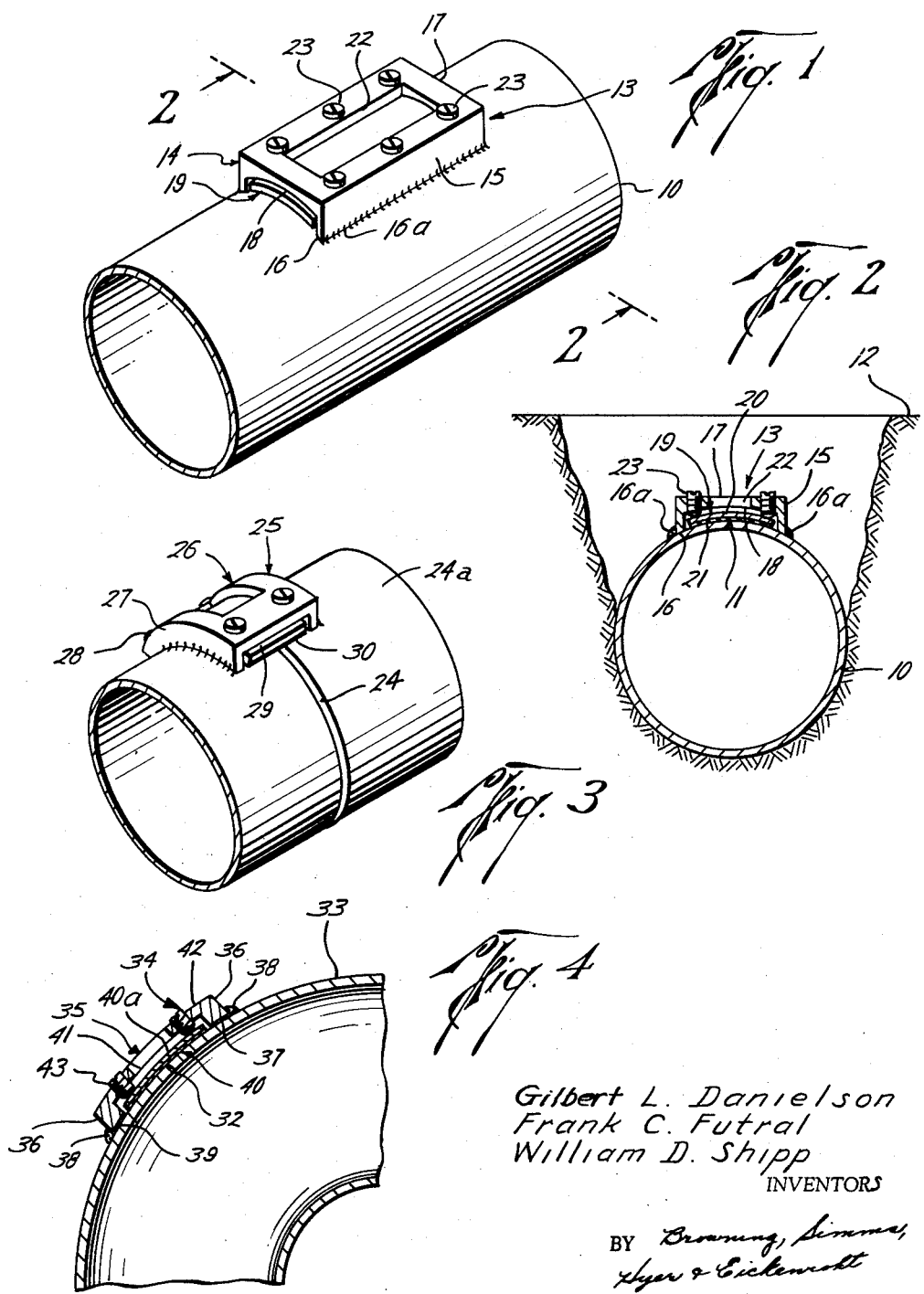

3,150,690
PIPE PATCH
Gilbert L. Danielson, 5603 Turtle Creek, Houston, Tex.;
and Frank C. Futral, P.O. Box 38; and William D.
Shipp, 814 S. 4th, both of La Porte, Tex.
Filed May 14, 1963, Ser. No. 280,470
7 Claims. (Cl. 138—99)

This invention relates in general to a pipe patch, and particularly to improvements in a type of patch which is useful in the repair of leaks from pipelines under pressure.

In the installation of a conventional pipe patch of this general type, a pad consisting of a metal backing plate having a layer of sealing material on its inner face is held with the sealing surface against the pipe and about the leak as a clamp is coupled about the pipe for urging the pad tightly against the pipe. With the pad so held by the clamp, the plate thereof is welded to the pipe so that the clamp may then be removed from about it. This is a particularly cumbersome procedure when the pipe is at least partially underground, since it is necessary to excavate all around the pipe to receive the clamp. Also, when the pipe is part of a pipeline containing fluid under high pressure, it is often difficult to hold the pad down upon the leak as the clamp is coupled about the pipe. On the other hand, it is impractical to wrap the clamp about the pad on an adjacent portion of the pipe and then move them laterally of the pipe to dispose the pad over the leak.

Still further difficulties are encountered with the installation of this particular type of patch, when the leak occurs in other than a smooth, straight run of the pipe. For example, such a patch is unsuitable for repairing leaks from circumferential welds, because the clamp cannot be coupled tightly over the weld. Similarly, the ordinary clamp for this purpose cannot be satisfactorily coupled about an elbow or other bend in a pipe.

In other well known pipe patches of this general type, a conically shaped nose on the inner side of a sealing member is urged against and into the leak by means of set screws or the like carried by an encircling clamp. In addition to presenting the same difficulties noted above, this type of patch does not permit the repair of other than pin-point type leaks—i.e., it won't seal line type leaks, whether they extend about a circumferential weld or in any other direction along the length of the pipe.

It is an object of this invention to provide a pipe patch of this general type which will overcome one or more of the shortcomings above mentioned.

Another object is to provide a pipe patch which may be installed upon an underground pipe, regardless of the location of the leak to be repaired, without the necessity of excavating all around the pipe.

Still another object is to provide a pipe patch which may be installed without the necessity of manually holding the sealing member down over the leak as a clamp is coupled about the pipe, thereby facilitating its use in repairing pipelines containing fluid under high pressure.

A further object is to provide such a pipe patch which is particularly well suited for use in the repair of leaks from circumferential welds as well as from bends in the pipe in that it does not require a wrap-around type of clamp for holding the sealing member tightly against the pipe.

Still a further object is to provide a pipe patch of the character above defined which is useful in the repair of leaks of most any configuration, including those which are of the long pencil-thin variety, and which extend either about or lengthwise of the pipe.

These and other objects are accomplished, in accordance with the illustrated embodiments of the present invention, by a pipe patch which includes a frame having side walls with lower edges seatable upon the pipe at opposite sides of the leak and a top which extends between the side walls above the pipe, at least one end of the frame being open to receive a pad having a sealing surface on one side. In accordance with a preferred method of installing this pipe patch, the side walls of the frame are first welded to the pipe so as to secure it thereto, and the pad is moved through the open end of the frame and beneath the top wall thereof to dispose its sealing surface over the leak. The frame carries set screws or other suitable means which may then be manipulated for engaging the other side of the pad to urge its sealing surface into sealing engagement with the pipe and about the leak.

Since only that portion of the pipe which is to be repaired need be exposed in the installation of this patch, it does not require excavation about the entire pipe. As a matter of fact, it has been found that most leaks from underground pipes occur over the top half of the pipe, so that not more than the top half of the soil surrounding the pipe need be excavated. Furthermore, the open end or ends of the frame permit it to be seated upon and secured to the pipe even while fluid under high pressure is escaping from the pipe. To further facilitate this installation of the frame, and in accordance with a preferred embodiment of the invention, there is an open window in the top wall of the frame for disposal over the leak in the pipe as the frame is seated thereon.

When the frame is first secured to the pipe by the welding operation above described, the pad may be moved into place beneath the top wall of the frame without having to be manually held down against the escape of pressure fluid from the leak. Furthermore, the top wall of the frame will continue to restrain the pad as the set screws on the frame are manipulated to urge the sealing surface of the pad into engagement with the pipe about the leak.

The pad includes a metal plate on the outer side of the sealing surface so that set screws carried by the frame may be brought to bear about spaced-apart portions thereof. More particularly, the side edges of the window in the top wall of the frame terminate short of the side walls of the frame to provide overhanging portions, and the pad is of a width greater than the side-to-side width of the window, so that longitudinally extending portions along each side of it may be disposed beneath these overhanging portions of the top wall on the frame as the pad is moved into the open end of the frame. Thus, the set screws can conveniently be carried by these overhanging portions for bearing downwardly upon such longitudinally extending portions of the backing plate of the pad. Preferably, the backing plate is preformed at least approximately to the curvature of the pipe so that it will move easily beneath the top wall of the frame.

When the patch is to be used in the repair of a leak from a straight run of the pipe and at a location other than a circumferential weld, the side walls of the frame are preferably parallel to one another and have straight lower edges which extend lengthwise or axially of the pipe when seated thereon. On the other hand, when the leak occurs from a circumferential weld about the pipe, the side walls of the frame are turned to extend laterally across the pipe so as to straddle the weld. Preferably, the side walls of this frame are also parallel to one another so that their lower edges may each be curved to fit the curvature of the pipe.

It is axiomatic, of course, that the sealing pad of this patch permits the repair of leaks having most any configuration. Furthermore, the frame may be seated in different locations over a fairly wide area of a bend in the pipe, particularly on its outer side where most leaks occur. For this purpose, however, the lower edges of the side walls of the frame of the patch are curved regardless of the orientation of the frame with respect to the direction of flow through the pipe. Although these edges would ordinarily conform to only one location of the pipe, in this embodiment of the patch, they include gaskets which will make them more universally applicable, particularly since experience has shown that great majority of leaks occur about the outer or convex side of the elbow which has the larger radius of curvature and thus permits a wider range of seating conformity.

In the drawings, wherein like reference characters are used throughout to designate like parts:

FIG. 1 is a perspective view of a straight run of pipe having a pipe patch installed thereon in accordance with one embodiment of the present invention;

FIG. 2 is a cross-sectional view of the pipe and patch of FIG. 1, as seen along broken line 2—2 and with the pipe shown at least partially underground;

FIG. 3 is another perspective view of a pipe having a pipe patch installed thereon in accordance with another embodiment of this invention, and particularly for the purpose of repairing a leak from a circumferential weld about the pipe; and FIG. 4 is a longitudinal sectional view of a pipe elbow having a patch installed in accordance with a still further embodiment of the present invention and for the purpose of repairing a leak on its outer side.

With reference now to the details of the above-described drawings, and particularly FIGS. 1 and 2 thereof, the pipe 10 will be seen to have a leak 11 (FIG. 2). As shown in FIG. 2, this pipe is laid at a level beneath the ground surface 12, in which case, as previously noted, the leak will ordinarily occur along some part of its upper surface, as illustrated. In such a case, and again as previously noted, the installation of the pipe patch 13 requires that only the soil above the pipe 10 be excavated. Furthermore, even if the leak should occur from either side of the pipe, only the soil about that portion of the pipe would have to be excavated.

For this purpose, the patch includes a generally rectangular frame 14 having side walls 15 extending parallel to one another and disposed substantially coaxially of the pipe so that their straight lower edges 16 will be seated upon the pipe at opposite sides of the leak, as shown in FIG. 2. A top wall 17 extends between the side walls above the pipe, and both ends of the frame are open at 18 so as to provide a space between the top wall and the pipe for receiving a pad 19 which may be moved therein from either open end of the frame. With the frame so seated and prior to installation of the pad, the side walls are welded at 16a to the pipe.

As best shown in FIG. 2, the pad 19 includes a backing plate 20 of metal or other rigid material which is preformed to a curvature corresponding to that of the pipe 10 and about an axis extending parallel to the direction in which it is moved into space 18. A sheet 21 of rubber or other suitable sealing material is cemented to the inner face of the backing plate 20 to provide a sealing surface on the inner side of the pad 19 for sealingly engaging the pipe about the leak 11 when the pad is moved into space 18 and urged downwardly against the pipe in the manner to be described.

As shown in FIG. 1, there is a window 22 in the top wall 17 of the frame for disposal over the leak 11 as the frame is seated upon and secured to the pipe. In its preferred form, the window extends for a substantial portion of the length of the frame, but terminates sufficiently short thereof to leave strong connecting webs of the top wall at each end of the frame. The side edges of the window terminate short of the side walls of the frame 15 to provide overhanging portions in which spaced-apart set screws 23 are mounted for movement vertically therein. Also, the pad 19 is of a width just less than the side to side width of the space 18 between the side walls so that longitudinally extending portions of the backing plate 20 of the pad will be disposed beneath the lower ends of the set screws 23. Thus, in the installation of the pad 19, the set screws may be backed off sufficiently to permit the pad to be moved into place and then turned downwardly so as to bear upon the backing plate 20, as shown in FIG. 2, and thereby urge the sealing surface of the pad into sealing engagement with the pipe about the leak.

In the embodiment of the invention shown in FIG. 3, it is contemplated that a leak (not shown) has occurred within a circumferential weld 24 about the pipe 24a. The patch 25 for repairing same also includes a frame 26 having side walls 27 connected by a top wall 28 disposed above the pipe 24a, although in this embodiment the parallel side walls and the space 29 between them and below the top wall extend transversely of the axis of the pipe to straddle the weld. Thus, the lower edges of these side walls as well as the top wall 28 are curved to fit the pipe, and the backing plate of the pad 30 is preformed into a curvature about an axis extending transversely to the direction in which it is moved into an open end of the frame. In other respects, the patch 25 corresponds to the patch 13, as will be obvious from a comparison of FIG. 3 with FIGS. 1 and 2.

Since the side walls of the frame 26 straddle the weld 24, there is no difficulty in seating and securing the frame 26 to the pipe. Furthermore, the resilient sealing surface on the inner side of the pad 30 readily conforms to any protuberance provided by the weld 24, particularly inasmuch as the space 29 between the top wall of the frame and the pipe is higher than the thickness of the pad 30.

For the purpose of repairing a leak 32 in the outer side of a pipe elbow 33, the pipe patch 34 shown in FIG. 4 comprises a frame 35 having side walls 36 which may extend in most any direction, although, as illustrated, extend transverse to the direction of flow through the pipe. That is, although the lower edges of these side walls are curved, such curvature can only approximate that of the portion of the pipe on opposite sides of the leak 32. To facilitate the seating of these lower edges and the securement of the side walls to a fairly wide range of areas about the outer side of the elbow, as by means of welds 38, there are gaskets 39 of sealing material on these lower edges 37 for seating upon the pipe just inwardly of the portions of the side walls to which the welding material is applied.

The backing plate 40a of the pad 40 which is moved into an open end of the frame 35, as well as the top wall 42 of the frame above the space 41 therein, are preferably preformed into a compound curvature approximating that of the outer surface of the pipe. Obviously, relatively small deviations between such pad and the curvature of the pipe may be compensated for by means of the set screws 43.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipe patch, comprising a frame having side walls with lower edges seatable upon the pipe at opposite sides of a leak therein and a top wall extending between the side walls above the pipe, at least one end of the frame being open, a pad having a sealing surface on one side and slidable through the open end of the frame and beneath the top wall thereof to dispose said sealing surface over the leak, and means on the frame for engaging the other side of the pad to urge the sealing surface thereof into sealing engagement with the pipe about the leak.

2. A pipe patch of the character defined in claim 1, wherein the side walls of the frame are parallel and the lower edges thereof seatable upon the pipe are straight.

3. A pipe patch of the character defined in claim 1, wherein the side walls of the frame are parallel and the lower edges thereof are curved to fit the pipe.

4. A pipe patch, comprising a frame having side walls with lower edges seatable upon the pipe at opposite sides of a leak therein and a top wall extending between the side walls above the pipe, said top wall having a window therein disposable over the leak in the pipe as the frame is seated thereon, at least one end of the frame being open, a pad having a sealing surface on one side and slidable through the open end of the frame and beneath the top wall thereof to dispose said sealing surface over the leak, and means on the frame for engaging the other side of the pad to urge the sealing surface thereof into sealing engagement with the pipe about the leak.

5. A pipe patch, comprising an open-ended frame having side walls adapted to be secured to the pipe on opposite sides of a leak therein and a top wall connecting the side walls and having a window therein spaced above the pipe, a pad having a backing plate on its outer side and a layer of sealing material on the inner face of the plate and movable through an open end of the frame and between the side walls thereof to dispose said layer over the leak, and set screws carried by the frame for bearing upon spaced-apart portions of the plate to urge the layer of sealing material into sealing engagement with said leak.

6. A pipe patch, comprising a frame having a top wall and spaced-apart, substantially parallel side walls depending therefrom for securement to the pipe on opposite sides of the leak, at least one end of the frame being open and the top wall having a window therein whose side edges terminate short of the side walls of the frame to provide it with overhanging portions, a pad having a sealing surface on one side and a bearing surface on the other side, said pad being of a width greater than the side to side width of the window but smaller than the width of the open end of the frame to permit it to be moved through said end into a position beneath the top wall and over the leak with its longitudinally extending portions thereof disposed beneath the overhanging portions of the top wall, and set screws carried by said overhanging top wall portions of the bearing surface of the pad so as to urge the sealing surface of the pad into sealing engagement with the pipe about the leak.

7. A pipe patch, comprising a frame having side walls with lower edges seatable upon the pipe at opposite sides of a leak therein and a top wall extending between the side walls above the pipe, at least one end of the frame being open, a pad having a sealing surface on one side and slidable through the open end of the frame and beneath the top wall thereof to dispose said sealing surface over the leak, and means for urging the sealing surface of the pad when so disposed into sealing engagement with the pipe about the leak.

References Cited in the file of this patent

UNITED STATES PATENTS

| | | |
|---|---|---|
| 2,492,507 | Tipton | Dec. 27, 1949 |
| 2,772,804 | Byrnes | Dec. 4, 1956 |

FOREIGN PATENTS

| | | |
|---|---|---|
| 27,116 | Great Britain | of 1912 |